United States Patent
Peng

(10) Patent No.: US 11,402,033 B2
(45) Date of Patent: Aug. 2, 2022

(54) PRESSING-CONTROLLED VALVE

(71) Applicant: KUCHING INTERNATIONAL LTD., Taichung (TW)

(72) Inventor: Hao-Nan Peng, Taichung (TW)

(*) Notice: Subject to any disclaimer, the term of this patent is extended or adjusted under 35 U.S.C. 154(b) by 0 days.

(21) Appl. No.: 17/034,081

(22) Filed: Sep. 28, 2020

(65) Prior Publication Data
US 2022/0099207 A1    Mar. 31, 2022

(51) Int. Cl.
*F16K 27/04* (2006.01)
*F16K 31/524* (2006.01)

(52) U.S. Cl.
CPC ...... *F16K 31/52475* (2013.01); *F16K 27/044* (2013.01)

(58) Field of Classification Search
CPC .......... E03C 1/04; F16K 11/06; F16K 11/065; F16K 11/0655; F16K 19/006; F16K 27/044; F16K 27/045; F16K 31/52; F16K 31/521; F16K 31/523; F16K 31/52441; F16K 31/52475; F16K 31/52483; F16K 31/524
USPC ...................... 137/625.17; 251/251, 262, 263
See application file for complete search history.

(56) References Cited

U.S. PATENT DOCUMENTS

| | | | | |
|---|---|---|---|---|
| 4,112,974 A | * | 9/1978 | Davis | F25B 41/26 137/625.29 |
| 11,067,198 B1 | * | 7/2021 | Peng | F16K 1/24 |
| 2015/0096116 A1 | * | 4/2015 | Doss | E03C 1/0408 4/570 |
| 2018/0264253 A1 | * | 9/2018 | Liu | A61M 39/22 |

* cited by examiner

*Primary Examiner* — Kevin F Murphy
*Assistant Examiner* — Jonathan J Waddy
(74) *Attorney, Agent, or Firm* — Egbert, McDaniel & Swartz, PLLC

(57) ABSTRACT

A pressing-controlled valve having a valve casing, a valve seat, a fixed valve plate, a movable valve plate, a driving piece, a press structure and a pulling structure, wherein the valve seat is assembled on one end of the valve casing. The fixed valve plate, movable valve plate and driving piece are disposed in the valve casing. A flow channel for fluid is formed among the valve seat, fixed valve plate and movable valve plate. The driving piece is in contact with the movable valve plate. The pulling structure includes a shaft lever, a guide block and a drawing piece. The press structure pulls the shaft lever the move, the shaft lever pulls the drawing piece through the guide block, so that the driving piece drives the movable valve plate to slide laterally, so as to enhance the handiness of flow control or the on/off of the flow channel.

12 Claims, 7 Drawing Sheets

PRESSING-CONTROLLED VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a piping installation for controlling fluid, and more particularly to an innovative structure type of pressing-controlled valve.

2. Description of Related Art Including Information Disclosed Under 37 CFR 1.97 and 37 CFR 1.98

The conventional pressing-controlled valve uses a press structure to pull a valve handle to move back and forth in axial direction, the on/off of internal flow path of the control valve is changed to control the water to or not to flow through the control valve. Said pressing-controlled valve cannot regulate the flow of water.

The known pull-type control valve comprises a valve casing, a valve handle, a driving seat, a movable valve plate, a fixed valve plate and a valve seat. Wherein the driving seat, the movable valve plate and the fixed valve plate are assembled in the valve casing. The movable valve plate and the fixed valve plate are made of ceramics respectively. The movable valve plate and the fixed valve plate tightly overlap each other. The driving seat is in contact with the movable valve plate. The valve seat is assembled on one end of the valve casing. The fixed valve plate is in contact with the valve seat. One end of the valve handle is in contact with the driving seat. The other end of the valve handle protrudes out of the valve casing.

When the valve handle is pulled laterally, the valve handle pulls the driving seat to slide laterally, so that the movable valve plate slides laterally, changing the flow of water through the water control valve or controlling the water to or not to flow through the water control valve.

BRIEF SUMMARY OF THE INVENTION

The main objective of the present invention is to provide a pressing-controlled valve, which can enhance the handiness and can control the flow or on/off.

In the present invention is a pressing-controlled valve which comprises a valve casing, a valve seat, a fixed valve plate, a movable valve plate, a driving piece, a press structure and a pulling structure, wherein the valve casing has a first end and a second end, the first end is opposite to the second end. The valve seat is assembled on the first end. The fixed valve plate, the movable valve plate and the driving piece are disposed in the valve casing. The fixed valve plate is in watertight contact with the valve seat. The movable valve plate and the fixed valve plate overlap each other. A flow channel for fluid is formed among the valve seat, the fixed valve plate and the movable valve plate. The driving piece is in contact with the movable valve plate, so that the driving piece drives the movable valve plate to slide laterally to regulate the flow of the fluid through the flow channel or the on/off of the flow channel.

The press structure is adjacent to the second end. The press structure comprises a press cap, a positioning element and a follower; wherein the press cap is axially pivoted on the positioning element. The positioning element is provided with a positioning structure: the follower is axially opposite to the press cap, so that the press cap presses the follower to move axially, the follower is located in a first position or a second position by the positioning structure.

The pulling structure is located between the press structure and the driving piece. The pulling structure comprises a joint holder, a shaft lever, a first spring, a guide block, a drawing piece and at least a second spring, wherein the joint holder is disposed in the valve casing, and the joint holder is located between the follower and the driving piece. The joint holder is provided with a punch hole, the shaft lever penetrates through the punch hole, the shaft lever is axially put in the first spring. Both ends of the first spring stop the follower and the joint holder respectively. One end of the shaft lever axially contacts the follower. The guide block is disposed on the other end of the shaft lever. One end of the guide block facing the driving piece forms a guide face. The guide face is a bevel face. The drawing piece is in contact with the driving piece, and the drawing piece is located between the driving piece and the shaft lever. One end of the drawing piece facing the shaft lever forms a pressure face, the pressure face coordinates with the bevel face of the guide face, the pressure face clings to the guide face. The second spring is disposed on one side of the drawing piece. One end of the second spring props the drawing piece, the other end of the second spring props the joint holder. Hereby, the follower pulls the shaft lever to move back and forth, the guide face presses the pressure face to force the drawing piece to slide laterally, the drawing piece draws the driving piece to drive the movable valve plate to slide laterally, so as to enhance the handiness of flow control or on/off of the flow channel.

In the present invention, the movable valve plate slides laterally against the fixed valve plate when the press cap is pressed, so as to regulate the flow of the fluid through the flow channel or the on/off of the flow channel.

DETAILED DESCRIPTION OF THE INVENTION

Figure 1:
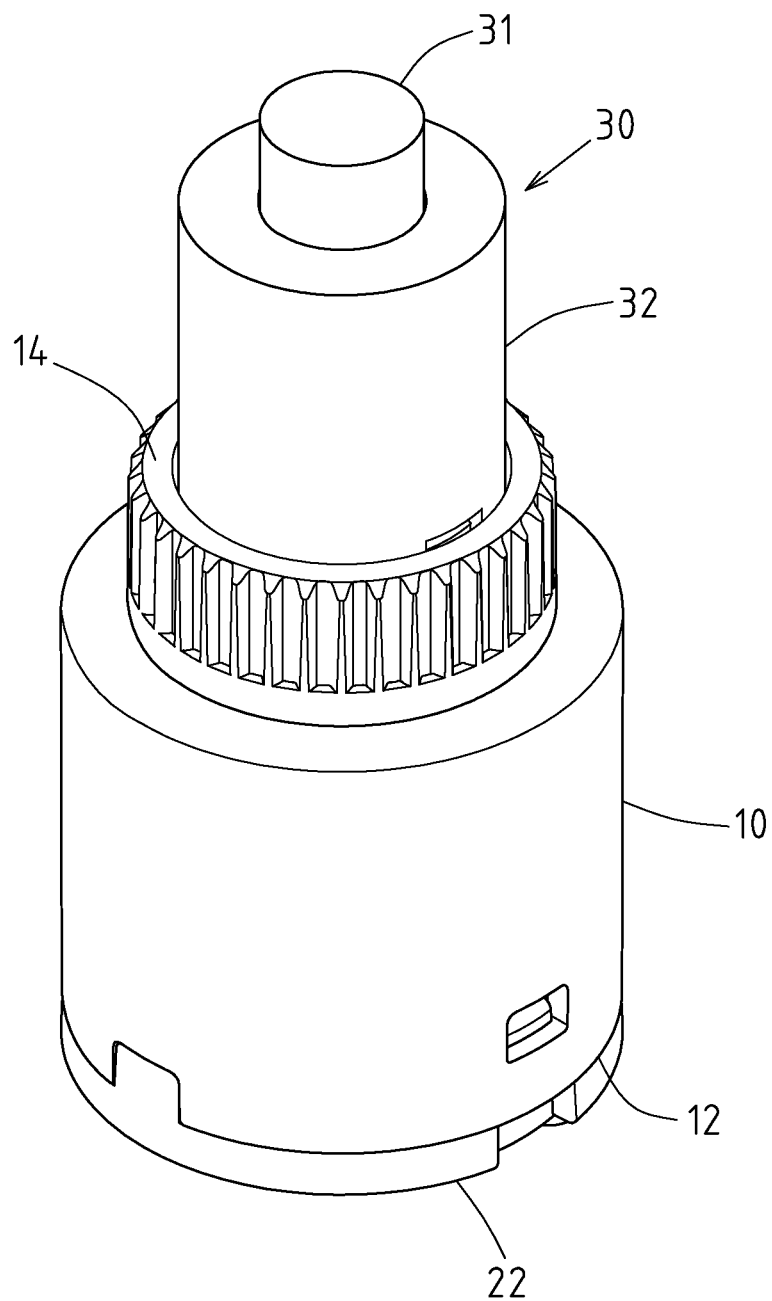
FIG. 1 is a perspective view of Embodiment 1 of the present invention.
Figure 2:
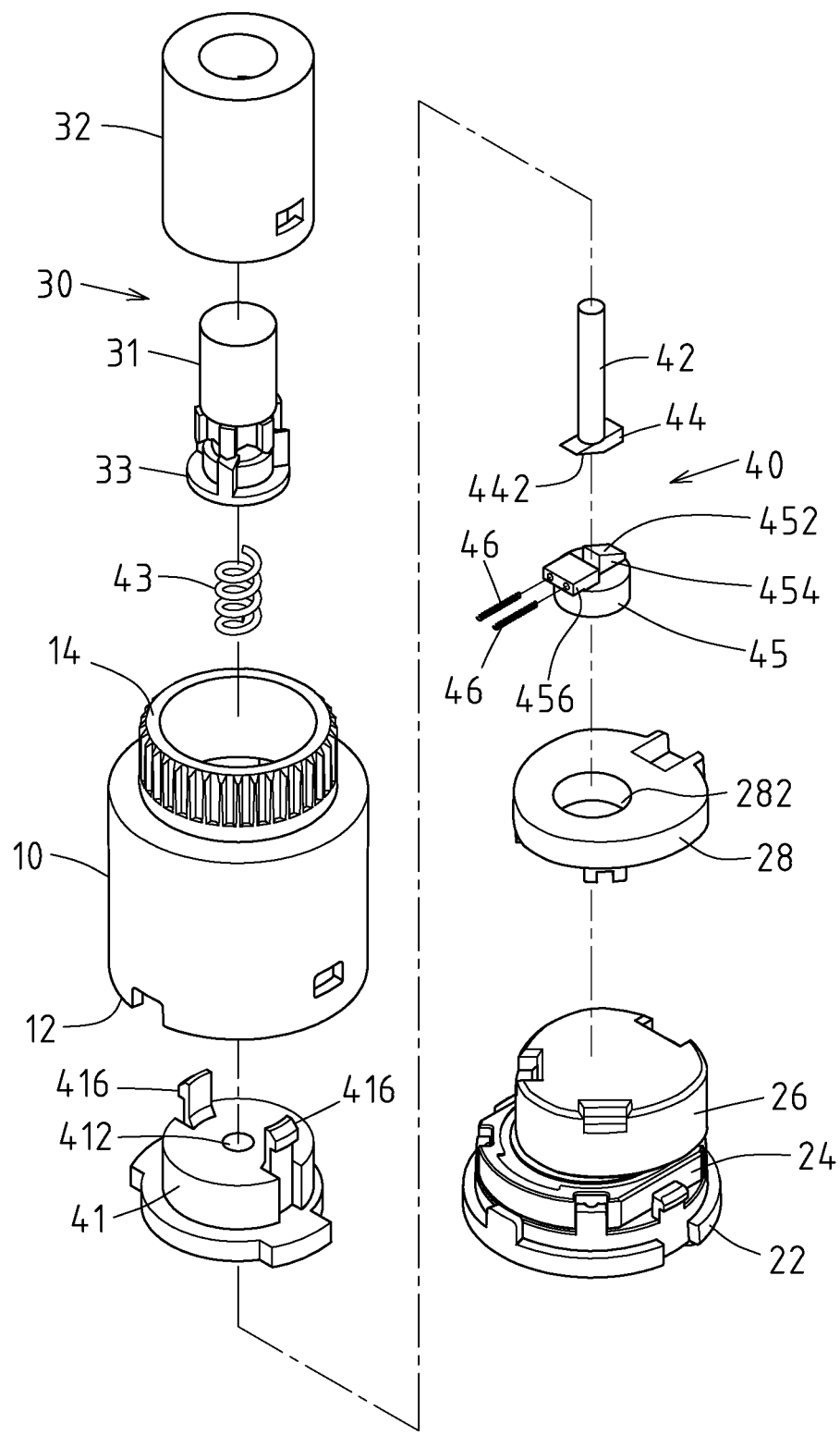
FIG. 2 is a three-dimensional exploded view of Embodiment 1 of the present invention.
Figure 3:
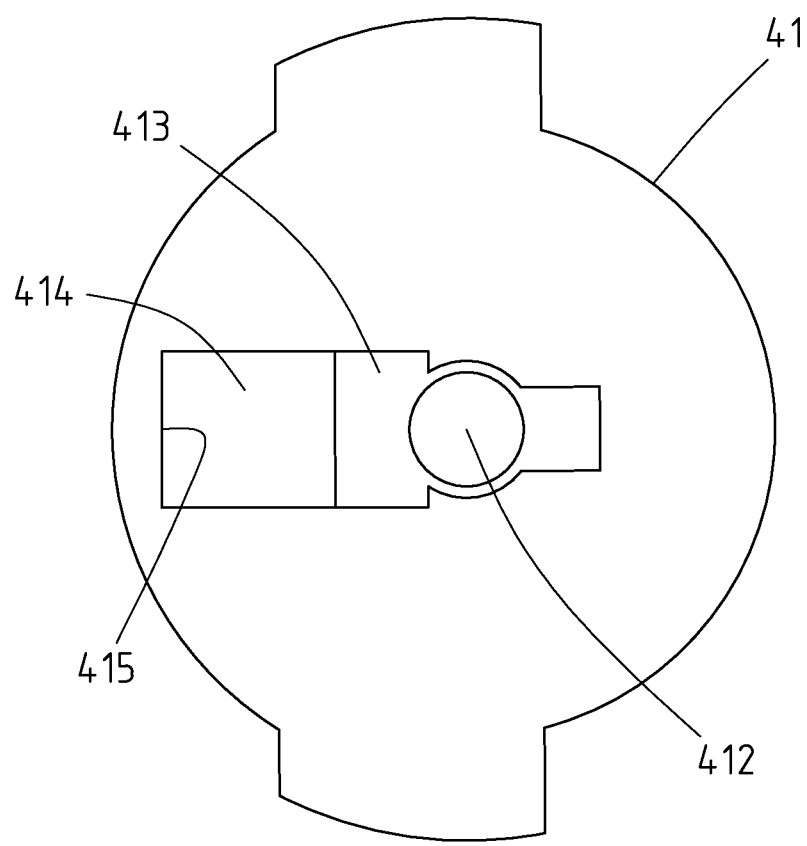
FIG. 3 is an upward view of joint holder in the Embodiment 1 of the present invention.

As shown in FIG. 1 to FIG. 5, Embodiment 1 of the present invention comprises a valve casing 10, a valve seat 22, a fixed valve plate 24, a movable valve plate 26, a driving piece 28, a press structure 30 and a pulling structure 40. The valve casing 10 has a first end 12 and a second end 14. The first end 12 is opposite to the second end 14. The valve seat 22 is assembled on the first end 12. The fixed valve plate 24, the movable valve plate 26 and the driving piece 28 are disposed in the valve casing 10. The fixed valve plate 24 is in watertight contact with the valve seat 22 through a leak stop element 23. The movable valve plate 26 and the fixed valve plate 24 overlap each other. A flow channel 25 for the fluid (not shown in the figure) is formed among the valve seat 22, the fixed valve plate 24 and the movable valve plate 26. The driving piece 28 is in contact with the movable valve plate 26, so that the driving piece 28 drives the movable valve plate 26 to slide laterally, thereby regulating the flow of the fluid through the flow channel 25 or the on/off of the flow channel 25.

The specific construction of the flow channel 25 shown in the figures is only one example, not to limit the explanation of the present invention. In different designs of the flow channel 25, when the movable valve plate 26 is actuated, the flow is changed, the flow channel 25 is opened or closed, or the mixing ratio of fluids with different properties (e.g. temperature) is changed. The persons of related technical fields can change the construction of the flow channel 25 according to the application target.

The press structure 30 is adjacent to the second end 14. The press structure 30 comprises a press cap 31, a positioning element 32 and a follower 33. Wherein the press cap 31 is pivoted on the positioning element 32, the positioning element 32 is provided with a positioning structure 322. The follower 33 is axially opposite to the press cap 31, so that the press cap 31 presses the follower 33 to move axially. The follower 33 is located in a first position 34 or a second position 35 by the positioning structure 322. The press structure 30 is often seen in the press-type water control valve, it is the existing technology the persons of the same domain are familiar to, the specific construction of the press structure 30 will not be described in detail.

The pulling structure 40 is located between the press structure 30 and the driving piece 28. The pulling structure 40 comprises a joint holder 41, a shaft lever 42, a first spring 43, a guide block 44, a drawing piece 45 and two second springs 46. Wherein the joint holder 41 is disposed in the valve casing 10, and the joint holder 41 is located between the follower 33 and the driving piece 28. The joint holder 41 is provided with a punch hole 412. The shaft lever 42 penetrates through the punch hole 412. The shaft lever 42 is axially put in the first spring 43. Both ends of the first spring 43 stop the follower 33 and the joint holder 41 respectively. One end of the shaft lever 42 axially contacts the follower 33. The guide block 44 is disposed on the other end of the shaft lever 42. In this case, the shaft lever 42 and the guide block 44 are integrated in one, and the shaft lever 42 is axially inserted in the positioning element 32. One end of the guide block 44 facing the driving piece 28 forms a guide face 442. The guide face 442 is a bevel face. The drawing piece 45 is in contact with the driving piece 28, and the drawing piece 45 is located between the driving piece 28 and the shaft lever 42. One end of the drawing piece 45 facing the shaft lever 42 forms a pressure face 452. The pressure face 452 coordinates with the bevel face of the guide face 442. The pressure face 452 clings to the guide face 442. The second springs 46 are disposed on one side of the drawing piece 45 side by side. One end of the second spring 46 props the drawing piece 45, the other end of the second spring 46 props the joint holder 41. Hereby, the follower 33 pulls the shaft lever 42 to move back and forth. The guide face 442 presses the pressure face 452 to force the drawing piece 45 to slide laterally. The drawing piece 45 draws the driving piece 28 to drive the movable valve plate 26 to slide laterally, so as to enhance the handiness of flow control or the on/off of the flow channel 25.

The quantity of the second springs 46 can be increased or reduced as required, but there shall be at least one of the second spring 46.

When the press cap 31 is pressed, the follower 33 moves from the first position 34 to the second position 35, so that the shaft lever 42 is actuated towards the drawing piece 45. As the guide face 442 is opposite to the pressure face 452, when the guide block 44 presses the drawing piece 45 towards the driving piece 28, the drawing piece 45 pulls the driving piece 28 to slide to the left of the figure, and the movable valve plate 26 is driven by the driving piece 28 to slide to the left ofthe figure, so as to change the flow channel 25, and to regulate the flow of the fluid through the flow channel 25 or the on/off of the flow channel 25.

Figure 4:
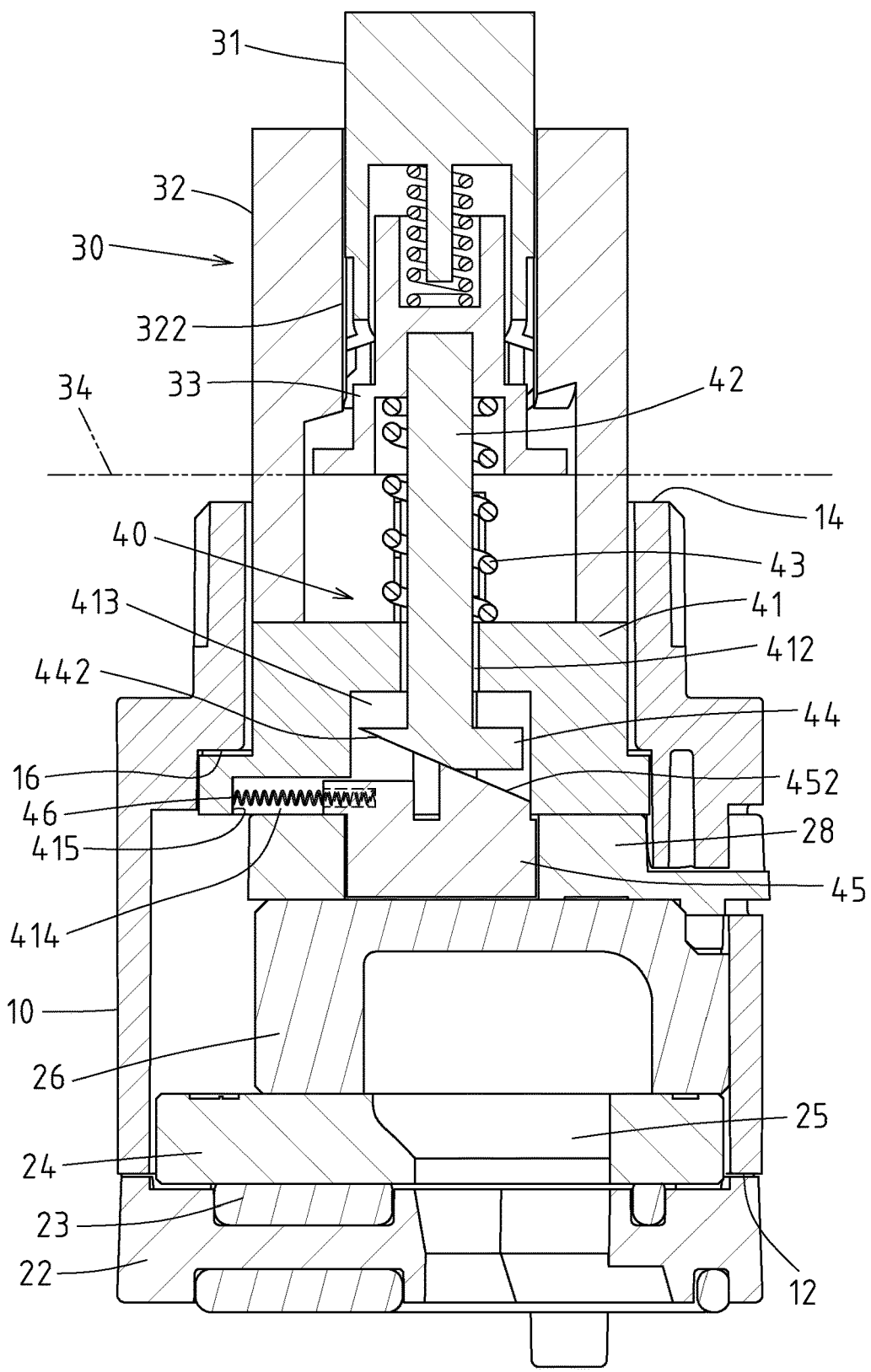
FIG. 4 is a sectional view of Embodiment 1 of the present invention.
Figure 5:
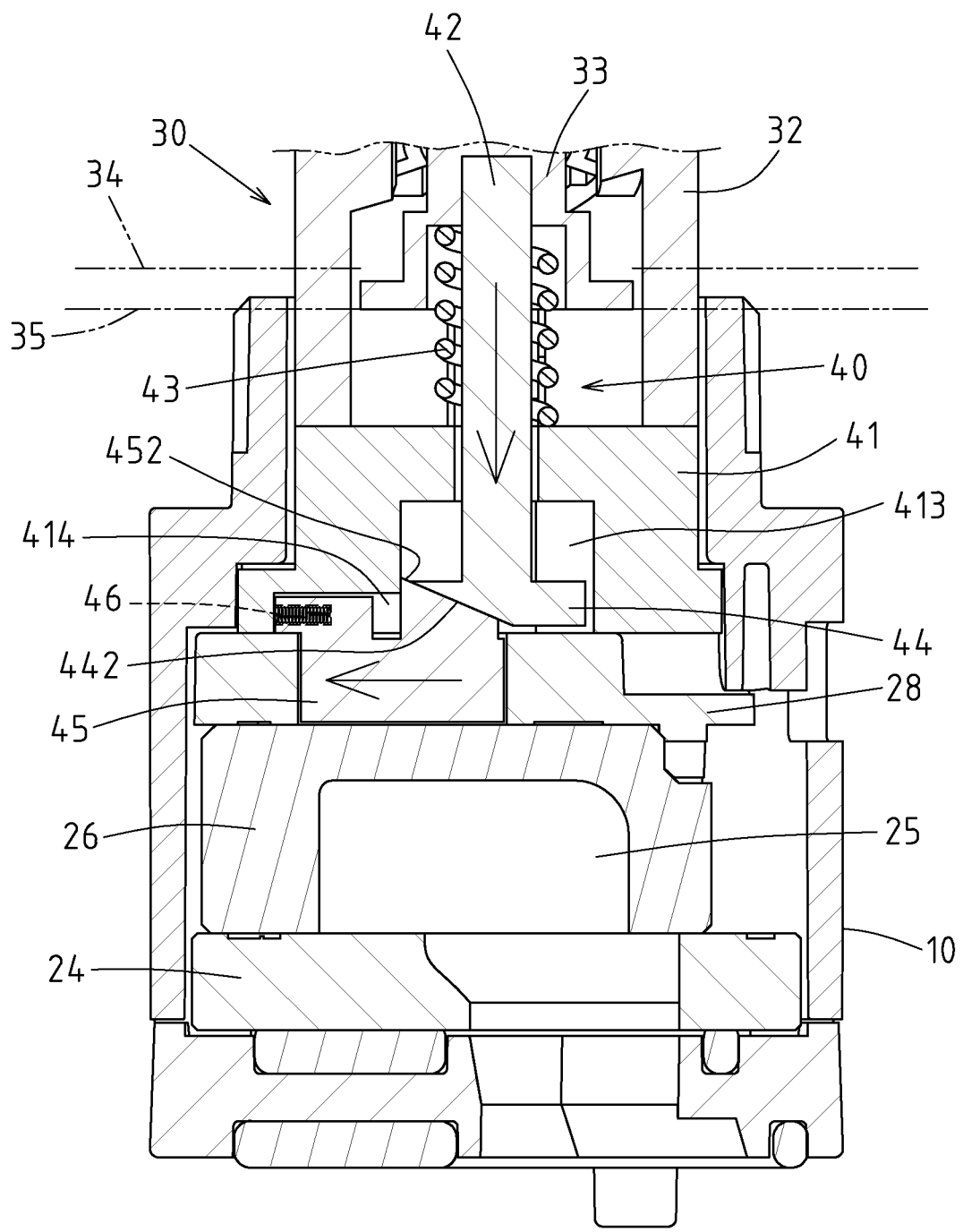
FIG. 5 is a side view of actuating state of Embodiment 1 of the present invention.

When the press cap 31 is pressed again, the first spring 43 provides an elastic force, the follower 33 is actuated from the second position 35 to the first position 34, the shaft lever 42 is actuated away from the swing piece 53, the second spring 46 provides an elastic force, the drawing piece 45 and the driving piece 28 turn from the state in FIG. 5 into the state in FIG. 4, so as to change the flow channel 25.

A first slot 413 and a second slot 414 are formed inside the joint holder 41. The punch hole 412 is connected to the first slot 413. The first slot 413 is laterally connected to the second slot 414. The guide block 44 is pivoted in the first slot 413. A pressure part 454 protrudes from one end of the drawing piece 45 facing the shaft lever 42. The pressure part 454 is pivoted in the second slot 414. The pressure face 452 is formed on the pressure part 454, so that the joint holder 41 confines the direction of actuation ofthe guide block 44 and the drawing piece 45. The second spring 46 props the inner wall 415 of the second slot 414.

A bulge 456 protrudes from the drawing piece 45, the bulge 456 is pivoted in the second slot 414, the second spring 46 props the bulge 456. The driving piece 28 is provided with an insert hole 282, the drawing piece 45 is embedded in the insert hole 282. The joint holder 41 and the driving piece 28 overlap each other. The joint holder 41 has two hooking parts 416. The hooking parts 416 are hooked with the positioning element 32 respectively, so as to position the positioning element 32. The valve casing 10 has a ring surface 16, the ring surface 16 is located between the first end 12 and the second end 14. The joint holder 41 is located between the ring surface 16 and the driving piece 28, and the ring surface 16 limits the joint holder 41, so as to position the joint holder 41.

Figure 6:
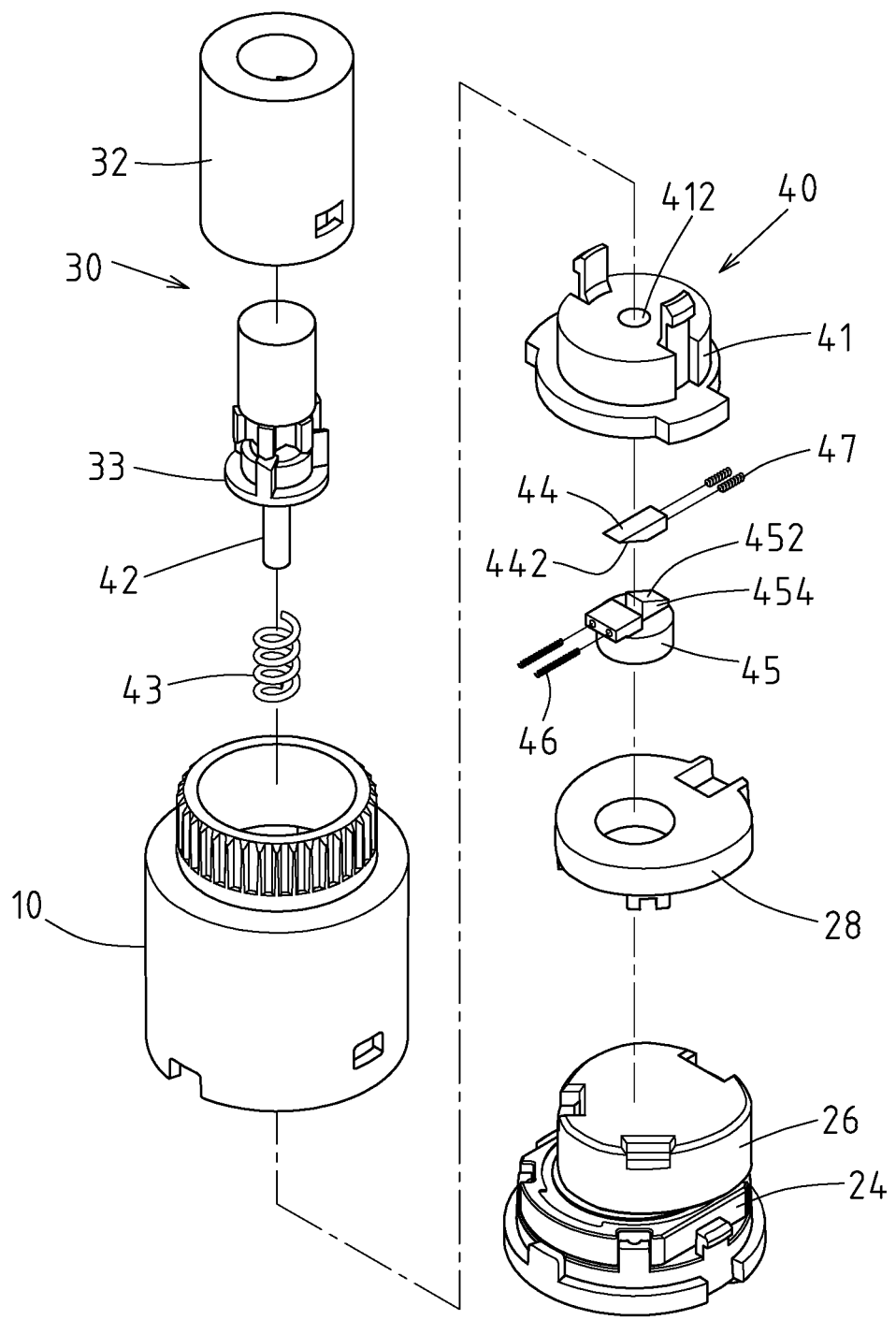
FIG. 6 is a three-dimensional exploded view of Embodiment 2 of the present invention.
Figure 7:
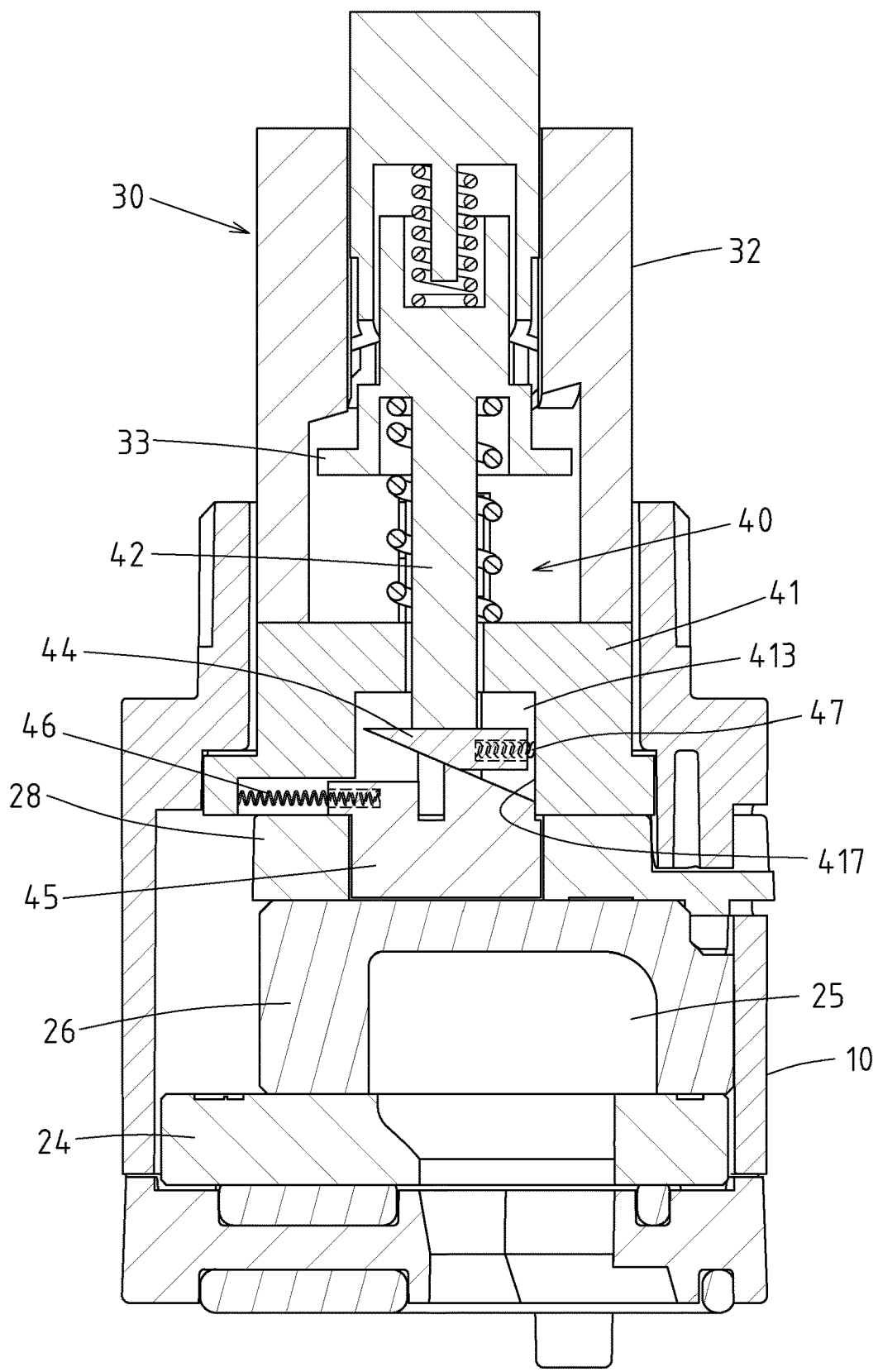
FIG. 7 is a sectional view of Embodiment 2 of the present invention.

As shown in FIG. 6 and FIG. 7, the major difference ofEmbodiment 2 from Embodiment 1 is that one end of the shaft lever 42 is integrated with the follower 33, the other end of the shaft lever 42 props the guide block 44, the shaft lever 42 is not integrated with the guide block 44. Hereby, when the shaft lever 42 is actuated towards the drawing piece 45, the shaft lever 42 presses the guide block 44, so as to pull the drawing piece 45. A third spring 47 can be disposed on one side of the guide block 44. One end of the third spring 47 props the guide block 44, the other end of the third spring 47 props the joint holder 41. Furthermore, the third spring 47 props the inner wall 417 of the first slot 413.

The actuation of Embodiment 2 is different from Embodiment 1, when the shaft lever 42 presses the guide block 44 to move towards the drawing piece 45, as the shaft lever 42 is not integrated with the guide block 44, the guide face 442 is opposite to the pressure face 452, when the drawing piece 45 slides to the left of the figure, the guide block 44 slides to the lower part and right of the figure. When the shaft lever 42 is actuated away from the drawing piece 45, the second spring 46 provides an elastic force, so that the drawing piece 45 slides to the right of the figure, the guide block 44 is guided by the pressure face 452 and the third spring 47 provides a thrust, the guide block 44 slides to the upper part and left of the figure, keeping contact with the shaft lever 42.

The Embodiment 1 or Embodiment 2 can be changed to another embodiment, the major difference of another embodiment is that the drawing piece 45 is integrated with the driving piece 28, so that the joint holder 41 is in contact with the positioning element 32, and the guide block 44 and the pressure part 454 are pivoted in the joint holder 41 respectively, when the positioning element 32 is rotated, the positioning element 32 can drive the drawing piece 45 to rotate with the joint holder 41, and the drawing piece 45 drives the movable valve plate 26 to rotate against the fixed valve plate 24, the flow of the fluid through the flow channel 25 is regulated or the on/off of the flow channel 25 is controlled by rotating the positioning element 32.

I claim:

1. A pressing-controlled valve comprising:
a valve casing having a first end and a second end, the first end being opposite the second end;
a valve seat assembled onto the first end of said valve casing;
a fixed valve plate disposed in said valve casing, said fixed valve plate being in watertight contact with said valve seat;
a movable valve plate disposed in said valve casing, said movable valve plate overlaps said fixed valve plate, a flow channel being formed in said valve seat, said fixed valve plate and said movable valve plate;
a driving piece disposed in said valve casing, said driving piece being in contact with said movable valve plate such that said driving piece drives said movable valve plate so as to slide laterally, said movable valve plate adapted to regulate a flow of fluid through the flow channel;
a press structure being adjacent the second end of said valve casing, said press structure comprising:
a press cap;
a positioning element having a positioning structure, said press cap being axially pivotable on said positioning element; and
a follower axially opposite to said press cap such that said press cap urges said follower to move axially, said press structure cooperative with said follower so as to move said follower to a first position or a second position; and
a pulling structure positioned between said press structure and said driving piece, said pulling structure comprising:
a joint holder disposed in said valve casing, said joint holder positioned between said follower and said driving piece, said joint holder having a punch hole;
a shaft lever extendable through the punch hole;
a first spring receiving said shaft lever, said first spring having two opposing ends that bear against said follower and said joint holder respectively one end of said shaft lever contacting said follower;
a guide block disposed on an opposite end of said shaft lever, one end of said guide block having a guide face facing said driving piece, said guide face having a bevel;
a drawing piece contacting said driving piece, said drawing piece positioned between said driving piece and said shaft lever, said drawing piece having a pressure face facing said shaft lever, the pressure face being cooperative with the bevel of the guide face, the pressure face abutting the guide face; and
a second spring disposed on one side of said drawing piece, one end of said second spring urging against said drawing piece, an opposite end of said second spring urging against said joint holder, said follower being cooperative with said shaft lever so as to move said shaft lever back-and-forth, the guide face urging against the pressure face so as to cause said drawing piece to slide laterally, said drawing piece drawing on said driving piece in order to cause said movable valve plate to slide laterally.

2. The pressing-controlled valve of claim 1, said joint holder having a first slot and a second slot formed therein, the punch hole being connected to the first slot, the first slot being laterally connected to the second slot, said guide block being pivotable in the first slot, said drawing piece having a pressure part protruding from an end of said drawing piece that faces said shaft lever, the pressure part being pivotable in the second slot, the pressure face being formed on the pressure part, said joint holder restricting a direction of movement of said guide block and said drawing piece, said second spring urging against an inner wall of the second slot.

3. The pressing-controlled valve of claim 2, wherein said drawing piece is integrated with said driving piece, said joint holder being in contact with the positioning element such that the positioning element causes said driving piece to rotate with said joint holder and said drawing piece.

4. The pressing-controlled valve of claim 3, wherein said joint holder has a pair of hooking parts, the pair of hooking parts being respectively hooked to the positioning element.

5. The pressing-controlled valve of claim 3, wherein said shaft lever has one end integrated with said follower, said shaft lever having an opposite end bearing against said guide block.

6. The pressing-control led valve of claim 5, further comprising:
a third spring disposed on one side of said guide block, said third spring having one end bearing against said guide block, said third spring having an opposite end bearing against said joint holder.

7. The pressing-controlled valve of claim 3, wherein said valve casing has a ring surface, the ring surface positioned between the first end and the second end of said valve casing, said joint holder positioned between the ring surface and driving piece, the ring surface restricting a movement of said joint holder.

8. The pressing-controlled valve of claim 2, wherein said joint holder has a pair of hooking parts, the pair of hooking parts being respectively hooked to the positioning element.

9. The pressing-controlled valve of claim 2, wherein said drawing piece has a bulge protruding therefrom, the bulge being pivotable in the second slot, said second spring urging against the bulge.

10. The pressing-controlled valve of claim 1, wherein said joint holder has a pair of hooking parts, the pair of hooking parts being respectively hooked to the positioning element.

11. The pressing-controlled valve of claim 1, wherein said driving piece has an insert hole, said drawing piece being embedded in the insert hole.

12. The pressing-controlled valve of claim 1, wherein said joint holder overlaps said driving piece.

\* \* \* \* \*